United States Patent [19]

Staudinger et al.

[11] Patent Number: 5,112,588
[45] Date of Patent: May 12, 1992

[54] METHOD OF AND APPARATUS FOR THE REMOVAL OF GASEOUS CONTAMINANTS FROM FLUE GAS OR REDUCTION OF THE CONTENT OF GASEOUS CONTAMINANTS IN A FLUE GAS

[76] Inventors: Gernot Staudinger, Messendorfberg 99, A-8042 Graz; Gernot Krammer, Pensionsweg 12, A-8043 Graz, both of Austria

[21] Appl. No.: 557,200

[22] Filed: Jul. 24, 1990

[30] Foreign Application Priority Data

Jul. 28, 1989 [AT] Austria .................. 1835/89

[51] Int. Cl.$^5$ .................. B01D 53/34; C01B 17/60
[52] U.S. Cl. .................. 423/244; 423/240.5
[58] Field of Search ............ 423/244 A, 244 R, 240 S

[56] References Cited

U.S. PATENT DOCUMENTS

| | | | |
|---|---|---|---|
| 3,862,295 | 1/1975 | Tolles | 423/244 |
| 4,477,426 | 10/1984 | Raskin | 423/244 |
| 4,604,269 | 8/1986 | Yoon | 423/242 |
| 4,782,772 | 11/1988 | Chughtai et al. | 423/244 A |
| 4,795,619 | 11/1989 | Lerner | 423/244 |

FOREIGN PATENT DOCUMENTS

| | | |
|---|---|---|
| 0211458 | 2/1987 | European Pat. Off. |
| 2625280 | 12/1976 | Fed. Rep. of Germany |
| 3235559 | 5/1984 | Fed. Rep. of Germany |
| 3308645 | 9/1984 | Fed. Rep. of Germany |
| 3628108 | 5/1987 | Fed. Rep. of Germany |
| 3544764 | 6/1987 | Fed. Rep. of Germany |

*Primary Examiner*—John Niebling
*Assistant Examiner*—Brian M. Bolam
*Attorney, Agent, or Firm*—Herbert Dubno

[57] ABSTRACT

Gaseous contaminants, especially sulfur dioxide, sulfur trioxide, hydrogen chloride or hydrogen fluoride are removed from flue gases by chemisorption. A solid finely divided sorbent, before being brought into contact with the flue gas, is treated in a reactor with dry steam. The sorbent before introduction into the reactor is brought to a temperature of 10° to 50° C. below the dewpoint temperature of the steam in the reactor and the steam injected into the reactor is introduced at a temperature not more than 60° C. above the dewpoint temperature, preferably 10° to 40° C. above the dewpoint temperature.

3 Claims, 2 Drawing Sheets

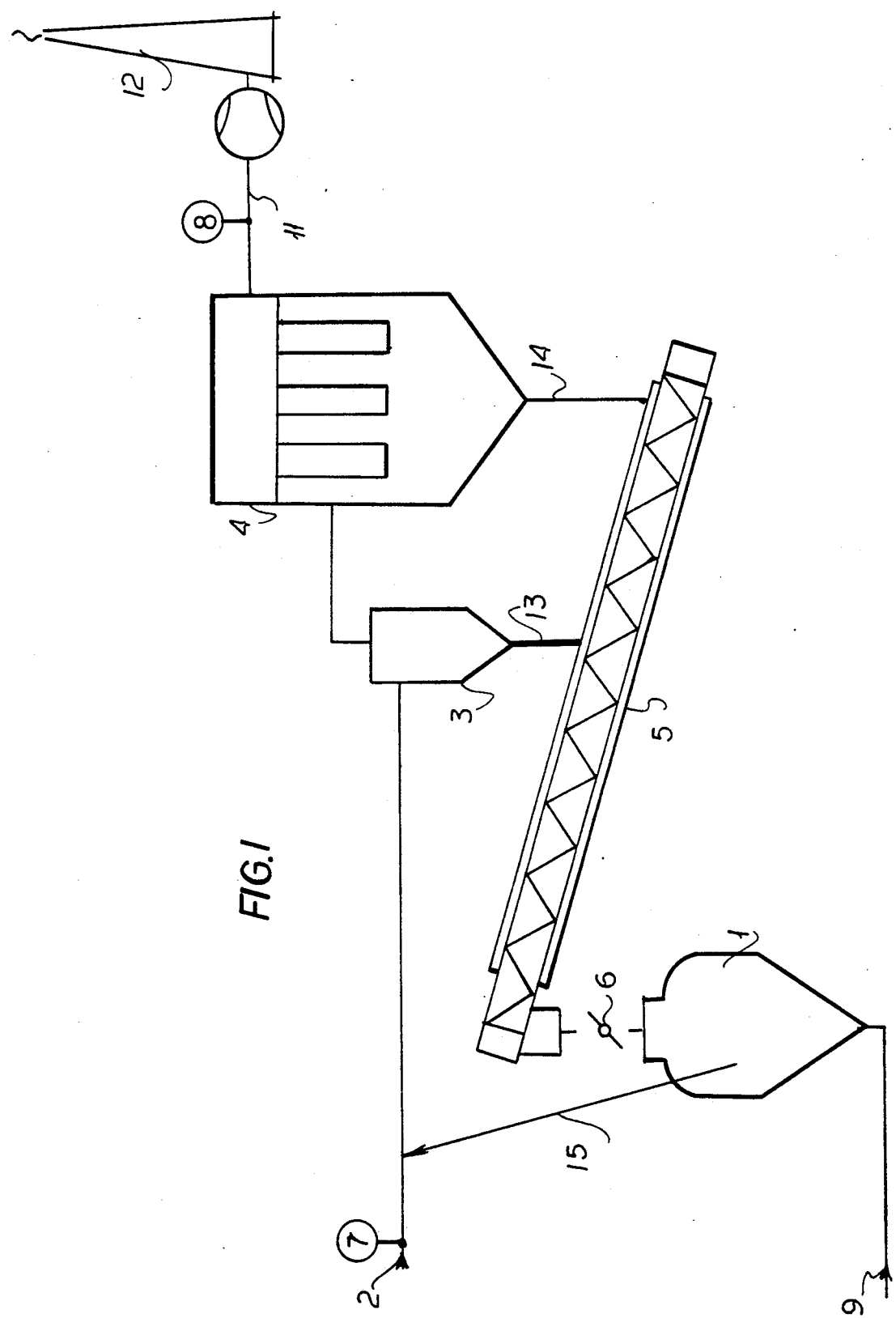

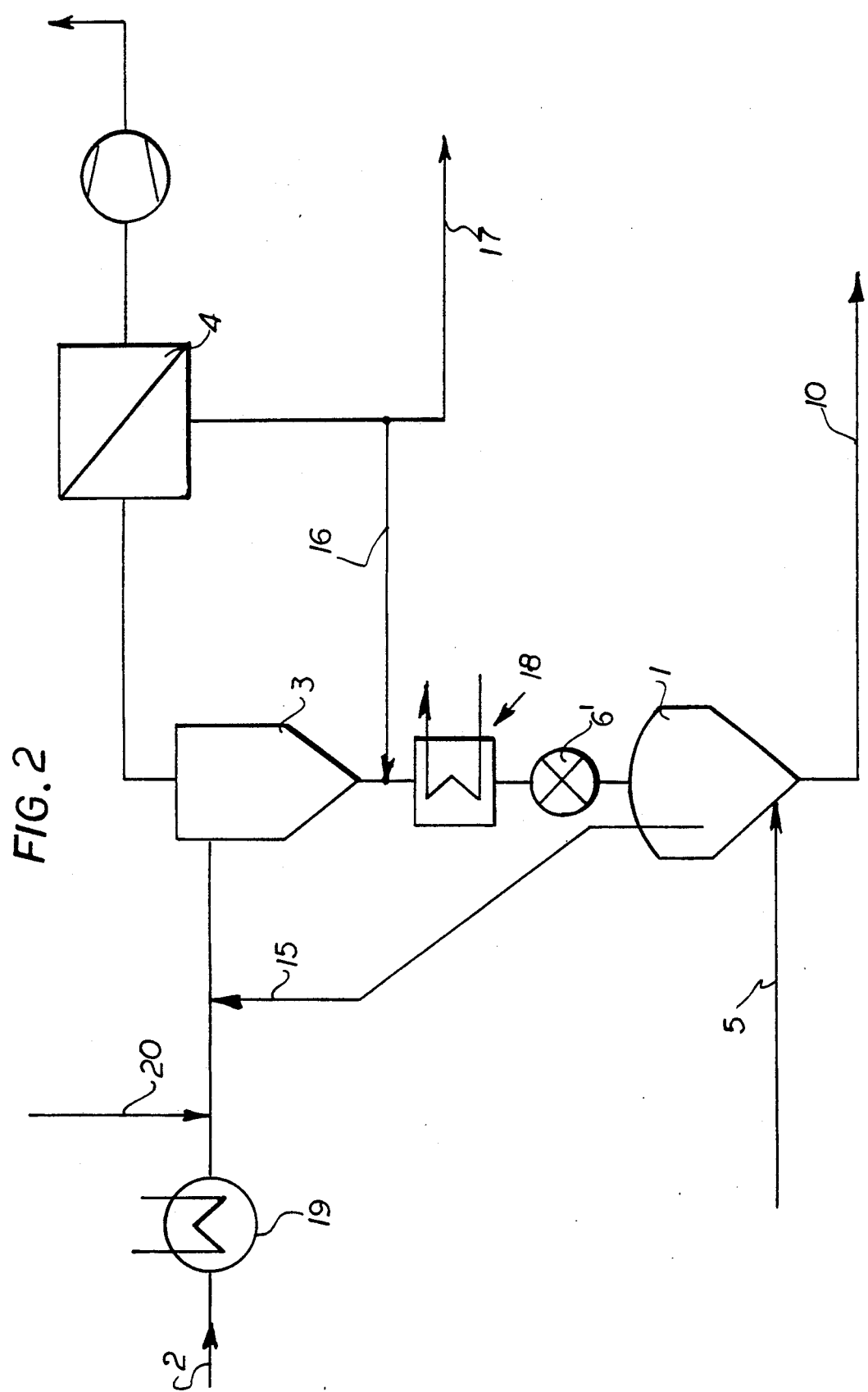

METHOD OF AND APPARATUS FOR THE REMOVAL OF GASEOUS CONTAMINANTS FROM FLUE GAS OR REDUCTION OF THE CONTENT OF GASEOUS CONTAMINANTS IN A FLUE GAS

Field of the Invention

The present invention relates to a process and apparatus for the removal from or reduction of the content of gaseous contaminants in a flue gas, i.e. a gas produced in the combustion of fossil fuels.

BACKGROUND OF THE INVENTION

The removal of gaseous contaminants from the flue gases of industrial combustion processes, for example the combustion of fossil fuels in power plants and industrial furnaces, has become increasingly important as the concern over environmental protection has grown.

The "acid" gases NO, $NO_2$, $SO_2$, $SO_3$, HCl, and HF are major contaminants of the atmosphere and are the main causes of acid rain by release of flue gases into the atmosphere. The maximum permissible emission of such gases is regulated by law and must be relatively small.

Apart from the nitrogen compounds, the other gases are generally removed from the flue gas by sorption processes and usually by a subsequent chemical reaction with a basic substance, for example, a calcium compound.

There are many processes for the recovery of sulfur dioxide. Because of the simplicity in handling, dry adsorption appears to be of considerable interest. The dry adsorbents which are most common are active carbon or active coal, which has primacy at the present time, although $Ca(OH)_2$, $CaCO_3$, CaO and $NaHCO_3$ are used, the latter compounds also reacting chemically with the adsorbed gas. R. Rasch, "Entwicklungsstand der trockenen Heissreinigung von Rauchgasen", in Maschinenmarkt Würzburg 85 (1979) 32 pages 620–623 has provided an overview as to this state of the art.

Because the most common of the sorption materials act not only as adsorbents but also as reactants, the process has generally been described as chemisorption. The disadvantage of all of these chemisorption processes is that in the available reaction time for technologically suitable processes, only a relatively thin product layer can be formed on the surface of the sorbent particles so that the core of the latter remains largely unutilized.

This disadvantage can be reduced by the use of particles having a very large specific surface, although it cannot be eliminated.

Investigations have been made into increasing the reaction rate between the gaseous contaminant and the usually alkaline sorbent by increasing the relative moisture content by means of injection of water into the hot flue gas (Noln, P. S., Hendriks, R. V. and Kresovich,, N., "Operation of the LIMB/Humidifier Demonstration Unit at Edgewater (104 MWel)" First Combined FGD and Dry $SO_2$ Control Symposium, 25 through 28 Oct., 1988, St. Louis, Paper Number 4A-1). Attempts have also been made to increase the residence time by baffling the flue gas stream (Kenakkala, T, "Status of the LIFAC Process" First Combined FGD and Dry $SO_2$ Control Symposium Oct. 25–28, 1988, St. Louis, Paper Number 4A-3).

A significant improvement of the utilization of the solid sorbents and of the desulfurization degree can be achieved, however, in-accordance with prior art techniques only when the temperature of the flue gas is lowered to a temperature close to the water dewpoint.

There are a number of process proposals for improving the utilization of the adsorbent particles, primarily by repeated use, i.e. recycling the particles which have been used to repeat the process. As a rule, a step of "activation" of the additives is interposed.

Thus in German Open Application DE-OS 26 15 828, it has been proposed to mix the sorbent with the gas stream to be cleaned via venturi duct sections and then to remove the sorbent from the gas stream and reintroduce it into the latter. To improve the sorption action, the gas, before contact with the sorbent has steam added to it. In addition, in this system, the supply of an oxidizing agent has been deemed to be necessary. The raw flue gas should have a temperature of at least 120° C.

In German Open Application DE-OS 26 32 502, a process for improving the adsorption and/or absorption or chemisorption in the removal of contaminants from flue gases has been disclosed in which the adsorbent dust after the separator is collected, is wetted to have a maximum moisture content of 10% and is then returned to the apparatus. The moisture content should preferably lie between 4 and 8% to avoid an encrustation on solid walls of the apparatus. The moistening can be effected by means of cooling air or by cooling the walls of the apparatus.

In German Open Application DE-OS 29 10 537, the regeneration of dry residues from a flue gas cleaning system has been proposed in which the solid residues are comminuted and thereafter directly fed to the reaction system so that the exposed or broken surfaces formed by the comminuting operation make free faces available so that the reaction can take place with the contaminants before the available surfaces are saturated This proposal requires the availability of a comminuting apparatus and process, i.e. additional apparatus which may be expensive, to free up surfaces of the nonreacted core of the solid sorbent.

German Open Application DE-OS 29 34 109 relates to a process in which the solid residues of a combustion process are finely milled and thereafter blown into the reaction stage along a flue gas path. Here as well a mechanical comminution is required to make the surface of the solid as large as possible.

German Open Application DE-OS 31 13 788 A1 effects a milling of the incompletely utilized sorbent withdrawn from a dry desulfurization process and supplies them to a wet desulfurization apparatus so as to obtain the highest possible efficiency of the sorption process. The utilization of the sorbent can be increased with simultaneous increasing of the degree of desulfurization.

The German Open Application DE-OS 31 23 064 proposes an improvement in the utilization of chemisorbents in that, following a passage of the chemisorption agent through the apparatus and before recycling to the apparatus, the chemisorbent is processed in a steam jet mill.

In the steam jet mill not only is there a comminution to new surfaces but also these new surfaces are found to be activated by moisture.

Austrian patent 385 210 describes a process in which an absorption agent utilized once is recovered from a dry flue gas desulfurization process together with the ash from the fuel and is activated for use in a second path with improved utilization. The activation of this "secondary" adsorbent can be effected with water and/or steam. A mechanical milling improves the activation further. The so activated solids are fed to the flue gas to be desulfurized at a temperature of 100° to 700° C.

U.S. Pat. No. 4,724,130 describes the addition of a promoter to the solid sorbent so as to improve the effectiveness of the latter. By scrubbing the recovered solid, the promoter, which is expensive or can be detrimental to the environment when deposited on waste dumps can be recovered with the scrubbing water and can be regenerated. The sorbent itself is in part recovered, dried and recycled.

In Austrian Patent 380,406, a process is described in which the lime additive which is employed for the desulfurization, is injected into the combustion chamber and recovered from the flue gases, comminuted and used again to treat the flue gas after treatment, in turn, with dry steam. There is also a series of proposals for the regeneration and/or activation of solid sorbents which have been used once, whether these are obtained from the lime additive processes (Austrian Application A 2935/83 and Austrian Patent 385 210) in the combustion chamber of a steam generator or are obtained from the already cooled flue gas stream. All of these process have been found to have some disadvantage. Either a mill or mechanical treatment is required or the sorbent to be regenerated must be moist. Further, one process may require a flue gas temperature in excess of 100° C. while another may require the cooling of the flue gas to a temperature $(T_p+5° C.)<T<(T_p+50° C.)$, in which T is the flue gas temperature and $T_p$ the dewpoint of water in the flue gas.

OBJECTS OF THE INVENTION

It is the principal object of the present invention to provide an improved process and apparatus for removing gaseous contaminants from a flue gas stream or reducing the level of such contaminants in a flue gas stream whereby drawbacks of earlier systems are obviated.

Another object of the invention is to provide a process and apparatus for the purposes described whereby, without the need for a milling step or a milling apparatus, a high utilization of a sorbent can be obtained.

SUMMARY OF THE INVENTION

It has now been discovered that a sorbent, especially a power plant gas which may contain unutilized calcium oxide and resulting from the lime additive process, i.e. the injection of calcium carbonate powder into a fossil fuel combustion chamber, as well as other sorbents for the acid components of a flue gas can be made active again or can have their reactivity enhanced in a simple manner by treating the sorbent in a fluidized bed reactor with dry steam and in a manner such that the temperature of the sorbent upon entry into the fluidized bed reactor is less than the dewpoint of the steam (i.e. at one bar of steam pressure is less than 100° C.) The temperature of the steam should not be more than 50° C. above the dewpoint. At atmospheric pressure, the temperature of the sorbent before entry into the reactor is preferably 50° to 100° C. and the steam temperature is preferably 105° to 135° C. before entry into the reactor. It is, however, also possible to shift the dewpoint by operating the fluidized bed reactor under other than atmospheric pressure or by diluting the steam with air or an inert gas. A mechanical milling step and/or a wetting of the sorbent with water or wet steam is not required.

The sorbent activated in this manner, especially ash, is admixed with the flue gas stream at an optimal flue gas temperature which can lie between 65° and 150° C. The lower the flue gas temperature the better is the sorption effect.

Apart from the aforedescribed power plant ash, the sorbent may be active carbon or active coal or some other fine porous material capable of reacting with the contaminants. The process for removing gaseous contaminants selected from the group which consists of $SO_2$, $SO_3$, HCl and HF from a flue gas may therefore comprise the steps of (a) introducing a solid finely divided sorbent for the contaminants into a reactor at a temperature below a dewpoint temperature of steam;

(b) contacting the solid finely divided sorbent in the reactor at the temperature below the dewpoint temperature with the steam by introducing the steam into the reactor at a temperature not greater than 60° C. above its dewpoint temperature;

(c) thereafter bringing the solid finely divided sorbent treated in step (b) into intimate contact with the flue gas thereby removing at least one of the contaminants therefrom by chemisorption on the sorbent; and (d) thereafter recovering the sorbent from the flue gas.

The steam is preferably introduced into the reactor in step (b) at a temperature between 10° and 40° C. above its dewpoint temperature. The sorbent is introduced into the reactor in step (a) at a temperature of 10° to 50° C. below its dewpoint temperature. The sorbent, upon recovery from the flue gas, can be treated anew with dry steam by steps (a) and (b) described above. Advantageously, depleted sorbent is removed from the reactor. The sorbent can be cooled before it is introduced into the reactor in step (a). The dewpoint can be raised in the reactor by applying a higher steam pressure thereto or can be lowered in the reactor by diluting the steam with air or the inert gas.

BRIEF DESCRIPTION OF THE DRAWING

The above and other objects, features and advantages of my invention will become more readily apparent from the following description, reference being made to the accompanying highly diagrammatic drawing in which:

FIG. 1 is a flow diagram illustrating an experimental set up for carrying out the invention; and FIG. 2 is a flow diagram of a practical embodiment of the apparatus of the invention.

SPECIFIC DESCRIPTION

FIG. 1 illustrates an experimental setup of an apparatus for carrying out the process of the invention in which power-plant ash, i.e. a sorbent produced in power plant combustion processes, with a calcium content of 17.5% by weight is introduced into a fluidized bed reactor 1 and is treated with dry steam therein.

The power-plant ash is fed to the fluidized bed reactor as will be described in greater detail hereinafter. The fluidizing steam is fed to the base of the reactor via the line 9.

The sorbent is entrained by the steam via the line and injected into a flue gas duct 2 carrying sulfur dioxide containing flue gas from a combustion chamber, such as the power plant boiler.

After the flue gas has been in contact with the sorbent in the duct 2, the gas passes into a preseparator 3, for example a cyclone, which is followed by a bag or cloth type filter 4 recovering the dust particles from the gas. The particulates which are recovered from the gas, namely, the ash pass by gravity through lines 13 and 14 onto the screw conveyor 5.

The cleaned flue gas is conducted via the line 11 and a blower to the chimney or stack 12. The collected fly ash is conducted by the heatable and coolable screw conveyor 5 to a rotary cell gate 6 which can be flushed with air, from which the fly ash is discharged into the fluidized bed reactor 1.

In the fluidized bed reactor, the ash forms a fluidized bed which is maintained by the steam fed through line 9 as the fluidizing and treating gas. In one test, the temperature of the ash before entering the gate 6 was 92° C. In the flue gas path before the point at which the line 15 supplies the sorbent to the flue gas, a measuring location 7 is provided at which composition can be measured.

A further measuring location 8 is provided in the duct 11 between the dust collector 4 and the chimney 12.

amount of heat recovered may be minimal, the heat recovery has economic limits. In many cases it has been found to be economically attractive to effect a portion of the flue gas cooling by the injection of water into the system. The atomizing nozzle or nozzles which may be used, indicated diagrammatically at 20 in FIG. 2, are preferably two component nozzles in which the water is injected with compressed air or steam. The compressed air or steam serving to atomize the water.

Other apparatus layouts are conceivable as well. What is important is that the ash be introduced into the reactor with a temperature below the dewpoint of the steam in the fluidized bed reactor 1 and that the steam in the latter is dry. Its temperature should not be more than 60° C. above the dewpoint.

Power-plant ash is, as noted, fly ash, for example fly ash produced by coal-fired combustion and especially brown coal fired combustion, refuse combustion and oil fired combustion, in which an adsorbent like calcium carbonate has been injected.

I claim:

1. A process for removing gaseous contaminants selected from the group which consists of $SO_2$, $SO_3$, HCl and HF from a flue gas, said process comprising the

| TEST RESULTS: | | | | | |
| --- | --- | --- | --- | --- | --- |
| STEAM TEMPERATURE FLUIDIZED BED °C. | FLUE GAS TEMPERATURE °C. | ASH TEMPERATURE BEFORE INTRODUCTION °C. | ASH CHARGING $g/m^3$ i. n. | $SO_2$ CONCENTRATION MEASURING LOCATION 7 $mg/m^3$ i. n. 0 % $O_2$ | $SO_2$ CONCENTRATION MEASURING LOCATION 8 $mg/m^3$ i. n. 0 % $O_2$ |
| 127 | 95 | 90 | 400 | 2200 | 200 |
| 126 | 100 | 92 | 400 | 2300 | 400 |
| 131 | 110 | 93 | 600 | 1950 | 550 |

In the embodiment of FIG. 2, the sorbent is treated in a fluidized bed reactor 1 and is conducted via the line by the fluidizing steam into the flue gas line.

In the preseparator, the greater part of the sorbent is collected and recycled to the fluidized bed reactor by gravity. The remainder of the sorbent is recovered in the dust separator 4. A portion of the recovered dust is fed back via line 16 while the remainder is discharged via line 17.

Furthermore, depleted sorbent can be removed from the fluidized bed reactor 1 as represented by the line 10 via a suitable gate. Fresh sorbent is either supplied with the flue gas stream 2 (for example calcium containing power plant fly ash) or is supplied to the flue gas 2 by an appropriate metering device not shown. Additional sorbent can be added via the line 16 if desired.

The supply of ash with a temperature below the dewpoint temperature of the steam to the fluidized bed is not simple in a technological manner. For this purpose a cell wheel gate 6' may be used with hot air flushing. When necessary, of course, especially in the case of a very high flue gas temperature, the sorbent may be cooled between the separator 3 and the introduction into the fluidized bed reactor 1. The cooling can be effected by a heat exchanger 18 which can be provided upstream of the gate (cell wheel 6'). The heat exchanger 18 can recover heat from the sorbent.

From a thermal efficiency point of view it is of special interest that the flue gas before the feed of the sorbent into it has the lowest possible temperature and for that reason a cooling heat exchanger 19 may be provided from which heat also can be recovered.

Since with decreasing temperature the heat exchange surfaces must be larger to allow heat recovery and the steps of:
 (a) producing a fly ash capable of activation for use as a sorbent by introducing an adsorbent lime compound into a fossil-fuel combustion in the form of coal-fired combustion, oil-fired combustion and refuse combustion to form said fly ash;
 (b) recovering said fly ash from said combustion;
 (c) cooling the recovered fly ash to a temperature between 10° and 50° C. below a dewpoint termperature of a dry steam, and introducing the cooled recovered fly ash into a fluidized bed reactor;
 (d) fluidizing said cooled recovered fly ash in said fluidized bed reactor with steam by introducing said dry steam as a fluidizing gas into said fluidized bed reactor at a temperature between 10° and 40° C. above said dewpoint temperature, thereby activating said fly ash and forming a sorbent therefrom;
 (e) cooling said flue gas;
 (f) recovering said sorbent from said fluidized bed reactor and introducing the recovered sorbent into the flue gas cooled in step (e) thereby absorbing said gaseous contaminants from said flue gas;
 (g) thereafter separating said sorbent from the flue gas from which said gaseous contaminants have been absorbed; and
 (h) recycling sorbent separated in step (g) to steps (c) and (d) for cooling and activation with said fly ash therein.

2. The process defined in claim 1 wherein said sorbent includes an activated carbon or coal.

3. The process defined in claim 1 wherein depleted sorbent is removed from said reactor.

* * * * *